United States Patent
Retsch, Jr. et al.

(10) Patent No.: US 7,361,715 B2
(45) Date of Patent: Apr. 22, 2008

(54) POLYMER ADDITIVES FOR POWDER COATINGS

(75) Inventors: William H. Retsch, Jr., Castle Shannon, PA (US); Michael J. Ziegler, Cranberry Township, PA (US); Jackie L. Kulfan, Mars, PA (US); Ronald R. Ambrose, Pittsburgh, PA (US); Christopher P. Kurtz, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 490 days.

(21) Appl. No.: 10/737,283

(22) Filed: Dec. 16, 2003

(65) Prior Publication Data

US 2005/0131146 A1 Jun. 16, 2005

(51) Int. Cl.
*C08L 77/00* (2006.01)
*C08L 79/08* (2006.01)
*C08L 67/00* (2006.01)
*C08L 75/02* (2006.01)
*C08L 75/04* (2006.01)

(52) U.S. Cl. ............... 525/420; 525/423; 525/424; 525/427; 525/436; 525/437; 525/438; 525/440; 525/441; 525/449; 525/452; 525/453; 525/454; 525/456; 525/457; 525/459

(58) Field of Classification Search ........... 525/420, 525/424, 423, 427, 436, 437, 438, 440, 441, 525/449, 453, 452, 454, 456, 457, 459
See application file for complete search history.

(56) References Cited

U.S. PATENT DOCUMENTS

| | | | |
|---|---|---|---|
| 4,981,921 A | 1/1991 | Blum et al. ............ 525/419 |
| 5,183,862 A | 2/1993 | Figuly .................. 525/437 |
| 5,418,301 A | 5/1995 | Hult et al. ............. 525/437 |
| 5,663,260 A | 9/1997 | Frechet et al. .......... 526/292.9 |
| 5,788,989 A * | 8/1998 | Jansen et al. ........... 424/486 |
| 5,834,118 A | 11/1998 | Rånby et al. ........... 428/482 |
| 6,025,462 A | 2/2000 | Wang et al. ............ 528/377 |
| 6,114,489 A | 9/2000 | Vicari et al. ........... 528/84 |
| 6,211,329 B1 | 4/2001 | Rehnberg et al. ........ 528/220 |
| 6,225,404 B1 | 5/2001 | Sorensen et al. ........ 525/54.1 |
| 6,252,025 B1 | 6/2001 | Wang et al. ............ 526/292.9 |
| 6,376,637 B1 * | 4/2002 | Bruchmann et al. ...... 528/60 |
| 6,384,172 B1 | 5/2002 | Dvornic et al. ......... 528/15 |
| 6,534,600 B2 * | 3/2003 | Dvornic et al. ......... 525/474 |
| 6,617,418 B1 | 9/2003 | Magnusson et al. ...... 528/417 |
| 2002/0026015 A1 | 2/2002 | Dvornic et al. |
| 2003/0004293 A1 | 1/2003 | Dvornic et al. |
| 2003/0018130 A1 | 1/2003 | Dvornic et al. |
| 2003/0069370 A1 | 4/2003 | Dvornic et al. |
| 2003/0088024 A1 | 5/2003 | Dvornic et al. |
| 2003/0161961 A1 | 8/2003 | Barsotti et al. |
| 2004/0043152 A1* | 3/2004 | Barsotti et al. ......... 427/283 |

FOREIGN PATENT DOCUMENTS

| | | |
|---|---|---|
| EP | 0473088 | 1/1998 |
| EP | 0 994 157 A1 | 4/2000 |
| EP | 1 070 748 A1 | 1/2001 |
| WO | WO 01/46296 | 6/2001 |

OTHER PUBLICATIONS

"Synthesis and Characterisation of Star Branched Polyesters with Dendritic Cores and the Effect of Structural Variations on Zero Shear Rate Viscosity", by H. Claesson et al., *Polymer* 43 (2002) pp. 3511-3518.

"Novel Concept for Low Temperature Curing Powder Coatings Based on Hyperbranched Polyesters", by Johansson et al., *Journal of Coatings Technology*, vol. 72, No. 906, Jul. 2000, pp. 49-54.

* cited by examiner

*Primary Examiner*—Ana Woodward
(74) *Attorney, Agent, or Firm*—Diane R. Meyers

(57) ABSTRACT

Star polymers prepared by reacting a highly branched polymer and either a lactone or lactam are disclosed. These star polymers find particular application as additives for powder coating compositions, to improve various performance properties thereof. Powder coating composition comprising the described star polymers are also disclosed.

33 Claims, No Drawings

POLYMER ADDITIVES FOR POWDER COATINGS

FIELD OF THE INVENTION

The present invention relates to polymers comprising a highly branched polymer to which is grafted linear moieties, and powder coatings comprising the same.

BACKGROUND INFORMATION

In recent years, powder coatings have become increasingly popular; because these coatings are inherently low in volatile organic content (VOC), their use significantly reduces air emissions during the application and curing processes.

Powder coatings are typically cured by heating the coated substrate to an elevated temperature, such as higher than 125° C. During the curing process, the powder particles melt and spread, and the components of the powder coating react. During this curing phase, gas can be generated and emitted. This gas generation, known as "outgassing", can result in bubbles, craters and other defects in the cured coating. It is therefore desired to have powder coatings with reduced outgassing. It is also desired to minimize or lower the temperature at which a powder coatings cure. This allows for powder coatings to be used on a wider variety of substrates, and also results in reduced energy needs.

Powder coatings can also be difficult to handle. Improved flow and/or leveling when using powder coatings is therefore also desired.

SUMMARY OF THE INVENTION

The present invention is generally directed to polymers that are the reaction product of a highly branched polymer and either a lactone or a lactam. The highly branched polymer is formed by step-growth polymerization between a polyfunctional first monomer having a first functional group and a polyfunctional second monomer having a second functional group; the first and second functional groups react with each other, but not themselves. Various monomers can be used to form the highly branched polymer, depending on the end product desired.

The polymers of the present invention find particular application as additives and/or film-forming resins for powder coatings. Powder coatings employing the current compositions will often demonstrate increased flexibility and may have increased toughness. The present powder coatings also may have improved flow and leveling characteristics and decreased gassing as compared with other powder coatings.

DETAILED DESCRIPTION OF THE INVENTION

The present invention is directed to compounds that comprise the reaction product of a highly branched polymer having terminal functional groups and a lactone, wherein the highly branched polymer is the step-growth polymerization reaction product of a polyfunctional first monomer having a first functional group and a polyfunctional second monomer having a second functional group, wherein the first and second functional groups will react with each other but not themselves. The reaction product of the highly branched polymer and the lactone is sometimes referred to herein as the "star polymer".

The present invention is also directed to compounds that comprise the reaction product of a highly branched polymer having terminal functional groups and a lactam, wherein the highly branched polymer is the step-growth polymerization reaction product of a polyfunctional first monomer having a first functional group and a polyfunctional second monomer having a second functional group, wherein the first and second functional groups will react with each other but not themselves. The reaction product of the highly branched polymer and the lactam is also sometimes referred to herein as the "star polymer".

As used herein, the term "highly branched polymer" refers to an ungelled polymer comprised of polyfunctional monomers, wherein at least one of the monomers has at least three functional groups. The present highly branched polymers generally contain a mixture of linearly and fully branched repeating units. This is in contrast to a dendrimer, which contains only fully branched repeating units without any linearly repeating units, and is also in contrast to linear polymers, which contain only linear repeating units without any branching.

As noted above, the highly branched polymers are prepared by step-growth polymerization of two different polyfunctional monomers. "Polyfunctional" as used herein refers generally to monomers having two or more functional groups; typically, monomers used according to the present invention will be di-, tri-, and/or tetrafunctional although the invention is not so limited. The monomers used will typically have only one type of functionality; the monomers may contain one or more additional functionality, provided this additional functionality does not interfere with the formation of the highly branched polymer. Various polyfunctional monomers can be used depending on the desired end product. For example, an alcohol and carboxylic acid can be reacted to form a highly branched polyester; an amine and carboxylic acid reacted to form a highly branched polyamide or if an excess of amine is used, a polyamido amine; an isocyanate and an alcohol reacted to form a highly branched polyurethane; and an amine and isocyanate reacted to form a highly branched polyurea. It will be appreciated that only highly branched polymers having terminal amine groups are suitable for reaction with the lactam, i.e. the polyamide, the polyamido amine and the polyurea. As noted, the appropriate monomers should be selected to obtain the desired highly branched polymer; in addition, the monomers should be selected such that the functional groups on each of the monomers will react with each other, but not themselves. Mixtures of monomers can be used; e.g. two or more different alcohols and two or more different acids.

The highly branched polymers used in the present invention have terminal functional groups. Theoretically, all of the terminal functional groups will be the same. The type of terminal functional group will depend on the starting monomers and the ratio of these monomers. For example, a highly branched polyester can be prepared by reacting a polyfunctional alcohol and a polyfunctional carboxylic acid; when the hydroxy groups of the alcohol are in excess, the polymer will have terminal hydroxy groups, but when the carboxylic acid functionality is in excess, the terminal functional group will be an acid. Terminal hydroxy or amine groups are needed to initiate the ring opening polymerization of the lactones and terminal amine groups are needed to initiate the ring opening polymerization of the lactams. Typically, either the hydroxy group from the polyfunctional alcohol or the amine group from a polyfunctional amine will provide the terminal functionality for the highly branched polymers.

Any suitable polyfunctional monomers can be used according to the present invention. Examples of suitable alcohols include ethylene glycol, propylene glycol, propane diol, butane diol, di(ethylene glycol), tri(ethylene glycol), tetra(ethylene glycol), di(propylene glycol), tri(propylene glycol), tetra(propylene glycol), glycerol, trimethylol propane ("TMP"), pentaerythritol, 1,1,1-tris(hydroxymethyl) ethane, triethanolamine and the like.

Examples of suitable dicarboxylic acids include malonic, dimethylmalonic, succinic, glutaric, adipic, trimethyladipic, pimelic, 2,2-dimethylglutaric azelaic, sebacic, suberic, 1,3-cyclopentanedicarboxylic, 1,2-cyclohexanedicarboxylic, 1,3-cyclohexanedicarboxylic, 1,4-cyclohexanedicarboxylic, phthalic, terephthalic, isophthalic, tetrahydrophthalic, hexahydrophthalic, 2,5-norbornanedicarboxylic, 1,4-naphthalic, diphenic, 4,4'-oxydibenzoic, diglycolic, thiodipropionic, 4,4'-sulfonyldibenzoic, and 2,5-naphthalenedicarboxylic acids. Anhydrides of any of the foregoing are also contemplated. Examples of suitable tricarboxylic acids include, but are not limited to, trimesic acid, trimellitic acid, pyromellitic acid, butanetricarboxylic acid, naphthalene tricarboxylic acids and cyclohexane-1,3,5-tricarboxylic acid. Mixtures of polycarboxylic acid compounds can also be used.

Examples of suitable amines include diethylenetriamine, triethylenetetramine, tetraethylenepentamine, dipropylenetriamine, ethylenediamine, tris(2-aminoethyl)amine, aminobenzylamines, aminohydrazides, and the like. Mixtures of multifunctional amines can also be used.

Examples of suitable isocyanates include bis(4-isocyanatocyclohexyl)methane, diphenylmethane diisocyanate, isophorone diisocyanate, toluene 2,4-diisocyanate, hexamethylene diisocyanate, m-tetramethylxylene diisocyanatic, 1,3-phenylene diisocyanate, and 4,4'-4"triphenylmethane triisocyanate. Mixtures of multifunctional isocyanates can also be used. The multifunctional isocyanates useful for preparing the hyperbranched polymers of this invention include monomeric multifunctional isocyanates, multifunctional isocyanate adducts and/or isocyanate-terminated prepolymers.

The highly branched polymers used according to the present invention are prepared through step-growth polymerization, also known as condensation polymerization. As will be appreciated by one skilled in the art, step-growth polymerization involves the reaction between two polyfunctional monomers. Any standard step-growth polymerization techniques can be used according to the present invention. The highly branched polymers used according to the present invention are therefore distinct from polymers formed from self-condensation of a polyfunctional monomer. Such self-condensation reactions typically involve the use of a monomer of type $AB_x$, wherein $X \geq 2$. This results in a well-defined material in which every molecule in the system, be it monomer or polymer, will have exactly one A group and more than one B group. Both the structure and function of these molecules are distinct from those used in the present invention.

Generally, the highly branched polymers are prepared by charging the reactants to a suitable reaction vessel and heating to a temperature appropriate to the type of polymer being prepared. Condensation products of the polymerization reaction, such as water in the case of polyester formulation, are continuously removed during the polymerization to promote high levels of monomer conversion, which results in hyperbranching. The polymerization should be carried out under conditions that will avoid gelation and crosslinking; this is accomplished through appropriate selection of monomer ratios, such as described by the Carothers' equation (W. H. Carothers, Transactions for the Faraday Society, Volume 32, Issue 39, 1936).

The highly branched polymers used according to the present invention will typically have a number average molecular weight of about 500 to 10,000, such as 1,000 to 5,000, as determined by gel permeation chromatography using linear polystyrene standards.

The highly branched polymer having terminal functionality is then further reacted with either a lactone or a lactam. The lactones and lactams can be substituted or unsubstituted. It will be appreciated that lactides are specific lactones and are within the present invention. Particularly suitable lactones are epsilon-caprolactones, such as methyl epsilon-caprolactone, a mixture of isomeric methyl caprolactones or a mixture of isomeric methyl epsilon-caprolactones with epsilon-caprolactone. Other examples include but are not limited to octanoic lactones, butyrolactones, valerolactones, gluconolactones, oxycyclotridecane-2-ones, and pentadecalactones. Examples of suitable lactams include epsilon-caprolactam, 2-azetidione, pyrrolidiones, and valerolactams.

The lactone or lactam is attached or grafted to the highly branched polymer through the ring opening polymerization of the lactone or the lactam initiated by the terminal functional group of the highly branched polymer. The results of the grafting is the "star polymer" according to the present invention. The grafting step is accomplished by charging the lactone or lactam to the reaction vessel and heating the mixture to a temperature suitable for the ring opening reaction, typically 80 to 250° C. An additional catalyst can also be added. As a result of the grafting procedure, between 1 and 100 percent of the terminal functional groups on the highly branched polymer will have a linear polymer chain comprised of at least one lactone or lactam molecule attached thereto. Typically, the large majority (i.e. greater than 90 percent, such as greater than 95 percent or 99 percent or greater) of the groups will be reacted. The linear polymer chains comprised of at least one lactone or lactam molecule that become attached will have either a terminal hydroxy in the case of a lactone or a terminal amine in the case of a lactam. Thus, the star polymer itself also has terminal functionality. By using a large excess of lactone or lactam molecules, the equal reactivity of the terminal groups on the highly branched polymer can force the grafting to occur at ~100% of the terminal groups. A 5 to 50 fold excess of lactone or lactam to terminal functional groups can be used as can about a 20 fold excess.

The reaction between the hydroxyl groups on the highly branched polymer with the lactone will result in opening of the lactone ring in the normal manner to produce a hydroxyl terminated lactone, the other end of which will be attached to the highly branched polymer. The hydroxyl terminated lactone chain may react with further lactone molecules to produce a hydroxyl terminated polylactone side chain. A "lactone chain" therefore refers to a hydroxyl terminated side chain that results from "ring opening" the lactone; a lactone chain according to the present invention can contain one or more lactone-derived units. In determining the ratio of lactone to highly branched polymer to use, consideration should be given to the amount of lactone needed to give the desired average lactone chain length. Generally, the lactone chain length may be increased indefinitely. Typically, the lactone does not merely polymerize on to a few hydroxyl groups of the highly branched polymer to produce several long lactone chains but rather the lactone molecules are distributed among a large number of hydroxyls. As noted above, typically greater than 90 percent, such as greater than 95 percent or even 99 percent or greater of the terminal functional groups of the highly branched polymer have a lactone chain attached thereto, although the invention is not so limited. The amount of lactone added (expressed as a weight percentage of the total weight of the star polymer— both branched polymer and lactone side-chains) is typically from 10 to 95 percent, such as 65 to 95 percent. Lactone chains comprised of 2 to 50 lactone units are particularly suitable for use in powder coatings.

Similarly, lactam chains are formed by reaction with the terminal amine groups of the highly branched polymer to result in a star polymer having an amine terminated lactam, the other end of which will be attached to the highly branched polymer. The amine terminated lactam may react with further lactam molecules to produce an amine terminated lactam chain. A "lactam chain" refers to an amine terminated side chain that results from "ring opening" the lactam; a lactam chain according to the present invention can have one or more lactam derived units. Typically, as with the lactone, the lactam molecules will be widely distributed on the highly branched polymer. Again, while 1 to 100 percent of the terminal functional groups on the highly branched polymer will have a lactam chain attached thereto, typically greater than 90 percent, such as greater than 95 percent or 99 percent or greater will have a lactam chain. All of the disclosures above regarding the lactones and lactone chains apply to the lactam/lactam chains as well. Lactam chains comprised of 2 to 50 lactam units are particularly suitable for use in powder coatings.

The weight average molecular weight of the star polymer of the present invention will typically be about 5,000 to about 500,000, such about 25,000 to 250,000, as determined by gel permeation chromatography using linear polystyrene standards. These star polymers are also characterized by melting temperatures in the range of about 40 to about 65° C. In some embodiments, such as some of the polyester and/or polyamide embodiments, the star polymer of the present invention will exhibit a melting temperature, but not a glass transition temperature.

The star polymers described herein find particular application as additives for powder coatings. Accordingly, the present invention is further directed to powder coatings comprising one or more of the star polymers described herein and a film-forming resin.

Any resin that forms a film can be used according to the present invention, absent compatibility problems. A particularly suitable resin for use in the present powder compositions is one formed from the reaction of a polymer having at least one type of reactive functional group and a curing agent having functional groups reactive with the functional group of the polymer. The polymers can be, for example, acrylic, polyester, polyether or polyurethane, and can contain functional groups such as hydroxyl, carboxylic acid, carbamate, isocyanate, epoxy, amide and carboxylate functional groups.

The use in powder coatings of acrylic, polyester, polyether and polyurethane polymers having hydroxyl functionality is known in the art. Monomers for the synthesis of such polymers are typically chosen so that the resulting polymers have a glass transition temperature ("Tg") greater than 50° C. Examples of such polymers are described in U.S. Pat. No. 5,646,228 at column 5, line 1 to column 8, line 7, incorporated by reference herein.

Acrylic polymers and polyester polymers having carboxylic acid functionality are also suitable for powder coatings. Monomers for the synthesis of acrylic polymers having carboxylic acid functionality are typically chosen such that the resulting acrylic polymer has a Tg greater than 40° C., and for the synthesis of the polyester polymers having carboxylic acid functionality such that the resulting polyester polymer has a Tg greater than 50° C. Examples of carboxylic acid group-containing acrylic polymers are described in U.S. Pat. No. 5,214,101 at column 2, line 59 to column 3, line 23, incorporated by reference herein. Examples of carboxylic acid group-containing polyester polymers are described in U.S. Pat. No. 4,801,680 at column 5, lines 38 to 65, incorporated by reference herein.

The carboxylic acid group-containing acrylic polymers can further contain a second carboxylic acid group-containing material selected from the class of C4 to C20 aliphatic dicarboxylic acids, polymeric polyanhydrides, low molecular weight polyesters having an acid equivalent weight from about 150 to about 750, and mixtures thereof. This material is crystalline and is preferably a low molecular weight crystalline or glassy carboxylic acid group-containing polyester.

Also useful in the present powder coating compositions are acrylic, polyester and polyurethane polymers containing carbamate functional groups. Examples are described in WO Publication No. 94/10213, incorporated by reference herein. Monomers for the synthesis of such polymers are typically chosen so that the resulting polymer has a high Tg, that is, a Tg greater than 40° C. The Tg of the polymers described above can be determined by differential scanning calorimetry (DSC).

Suitable curing agents generally include blocked isocyanates, polyepoxides, polyacids, polyols, anhydrides, polyamines, aminoplasts and phenoplasts. The appropriate curing agent can be selected by one skilled in the art depending on the polymer used. For example, blocked isocyanates are suitable curing agents for hydroxy and primary and/or secondary amino group-containing materials. Examples of blocked isocyanates are those described in U.S. Pat. No. 4,988,793, column 3, lines 1 to 36, incorporated by reference herein. Polyepoxides suitable for use as curing agents for COOH functional group-containing materials are described in U.S. Pat. No. 4,681,811 at column 5, lines 33 to 58, incorporated by reference herein. Polyacids as curing agents for epoxy functional group-containing materials are described in U.S. Pat. No. 4,681,811 at column 6, line 45 to column 9, line 54, incorporated by reference herein. Polyols, materials having an average of two or more hydroxyl groups per molecule, can be used as curing agents for NCO functional group-containing materials and anhydrides, and are well known in the art. Polyols for use in the present invention are typically selected such that the resultant material has a Tg greater than about 50° C.

Anhydrides as curing agents for epoxy functional group-containing materials include, for example, trimellitic anhydride, benzophenone tetracarboxylic dianhydride, pyromellitic dianhydride, tetrahydrophthalic anhydride, and the like as described in U.S. Pat. No. 5,472,649 at column 4, lines 49 to 52, incorporated by reference herein. Aminoplasts as curing agents for hydroxy, COOH and carbamate functional group-containing materials are well known in the art. Examples of such curing agents include aldehyde condensates of glycoluril, which give high melting crystalline products useful in powder coatings. While the aldehyde used is typically formaldehyde, other aldehydes such as acetaldehyde, crotonaldehyde, and benzaldehyde can be used.

The film-forming resin described above is generally present in the powder coatings of the invention in an amount greater than about 50 weight percent, such as greater than about 60 weight percent, and less than or equal to 95 weight percent, with weight percent being based on the total weight of the composition. For example, the weight percent of resin can be between 50 and 95 weight percent. When a curing agent is used, it is generally present in an amount of up to 30 weight percent; this weight percent is also based on the total weight of the coating composition.

It will be appreciated that the hydroxyl functionality that results from the lactone addition or the amine functionality that results from the lactam addition will react with one or more of the other components of the powder coating composition. For example, if the star polymer has hydroxyl functionality at the end of a lactone chain, a blocked isocyanate crosslinker and a hydroxy functional film forming resin can be used.

It is also possible, according to the present invention, to modify the functionality that is present on the star polymer. For example, the hydroxy functionality that results from lactone grafting can be converted to an acidic functionality, by reacting the hydroxy, for example, with a cyclic carboxylic acid anhydride. This reaction can be carried out by charging the hydroxy functional star polymer to the reaction vessel and heating the mixture to a temperature suitable for the ring opening of the cyclic anhydride, such as 80 to 150° C. In this manner, the hydroxy functional star polymer is converted to an acidic functional star polymer. This conversion may be relevant in a system wherein a curing agent that is reactive with a carboxylic acid functional group is desired rather than a curing agent that is reactive toward a hydroxy functional group, such as in a system using triglycidyl isocyanurate. Other moieties as desired by the user could also be introduced through reaction with the terminal hydroxy or amine on the star polymer. One embodiment of the present invention specifically excludes acrylic functionality or other compounds with double bonds being attached to the end of the lactone or lactam chain; in this embodiment, a powder coating comprising the star polymer would not have radiation curable moieties. Another embodiment specifically excludes the addition of conductive or photographically useful moieties into the polymer, such as onto the end of the lactone or lactam chain; in this embodiment, a powder coating comprising the star polymer would not have conductive or photographically useful moieties. Yet another embodiment specifically excludes the addition of hydrolyzing moieties onto either the highly branched polymer or the star polymer of the present invention; in this embodiment, a powder coating comprising the star polymer would not have hydrolyzing moieties.

The additive of the present invention is typically present in the curable powder coating composition in an amount ranging from 0.1 to 20 weight percent, such as 1 to 10 weight percent, or about 5 weight percent, with weight percent based on total weight of the coating composition. As used herein, "curable coating composition", "cured coating composition" and like terms will be understood as referring to a composition in which the components react with each other so as to resist melting upon heating. It will be appreciated that inclusion of the present additives or star polymers in the powder coatings of the present invention will result in at least one improvement to the performance characteristics of the present powder coatings, such as improved flow and/or improved leveling, decreased gassing, increased flexibility, and/or improved appearance. Even slight improvements in any of these characteristics is deemed an improvement according to the present invention. Moreover, gloss can be more easily varied with the coatings of the present invention.

The powder coating compositions of the present invention may optionally contain other additives such as waxes for flow and wetting, flow control agents, such as poly(2-ethylhexyl)acrylate, degassing additives such as benzoin and MicroWax C, adjuvant resin to modify and optimize coating properties, antioxidants, ultraviolet (UV) light absorbers and catalysts. Examples of useful antioxidants and UV light absorbers include those available commercially from Ciba Specialty Chemicals Corporation under the trademarks IRGANOX and TINUVIN. These optional additives, when used, can be present in amounts up to 20 percent by weight, based on total weight of the coating.

The compounds of the present invention, as well as any additional additives, can be added at any time during the formulation of the powder coating. For example, curable powder coating compositions of the present invention can be prepared by first dry blending the film-forming resin, and any of the additives described above including the present compounds, in a blender, such as a Henschel blade blender. The blender is operated for a period of time sufficient to result in a homogenous dry blend of the materials. The blend is then melt blended in an extruder, such as a twin screw co-rotating extruder, operated within a temperature range sufficient to melt but not gel the components. The melt blended curable powder coating composition is typically milled to an average particle size of from, for example, 15 to 80 microns. Other methods known in the art for preparing powder coatings can also be used.

In certain embodiment of the present invention, the star polymers themselves comprise the film forming resin. In such embodiments, the curable powder coating comprises the star polymer described herein and a suitable crosslinker. Such crosslinkers are described above or are otherwise known to those in the art. In these embodiments, the star polymer may comprise 40 to 80 weight percent of the total composition. Additives and methods of manufacture described above or known to those skilled in the art can be used to prepare these powder coatings.

The powder coating compositions are most often applied by spraying, and in the case of a metal substrate, by electrostatic spraying, or by the use of a fluidized bed. The powder coating can be applied in a single sweep or in several passes to provide a film having a thickness after cure of from about 1 to 10 mils, usually about 2 to 4 mils. Other standard methods for coating application can be employed such as brushing, dipping or flowing.

Generally, after application of the coating composition, the coated substrate is baked at a temperature sufficient to cure the coating. Metallic substrates with powder coatings are typically cured at a temperature ranging from 230° F. to 650° F. for 30 seconds to 30 minutes.

In certain embodiments, the present coating compositions comprise star polymers that are the reaction product of the highly branched polymer and lactone that has terminal hydroxy groups or whose terminal hydroxy groups have been converted to acid groups; the star polymers do not have any additional moieties attached thereto. In certain embodiments the star polymer used in the present coatings does not contain a UV curable moiety, such as (meth)acrylate.

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. Plural encompasses singular and vice versa. Also, as used herein, the term "polymer" is meant to refer to oligomers and both homopolymers and copolymers; the prefix "poly" refers to two or more.

EXAMPLES

The following examples are intended to illustrate the invention, and should not be construed as limiting the invention in any way.

Example 1

A highly branched polyester was prepared using the following procedure. One hundred parts by weight of trimethylol propane, 81.1 parts by weight of adipic acid, and 5.6 parts by weight dibutyl tin oxide were charged to a round-bottomed glass flask equipped with a mechanical stirrer, nitrogen inlet tube, thermometer, steam jacket column, fractionating column, and a distillation head connected to a condenser and a receiver. The resultant mixture was heated to react in a nitrogen atmosphere. At about 107° C., water generated by the esterification process began to be collected. With continuous removal of water, heating continued to 200° C. The reaction was allowed to continue until water was no longer being generated by the reaction, at which time the reaction product was cooled to ambient temperature.

To this highly branched polyester was added 2606.9 parts by weight of ε-caprolactone. The resultant mixture was heated to react in a nitrogen atmosphere at a temperature of 165° C. The reaction was allowed to progress for four hours at that temperature.

The reaction product was then cooled, discharged and analyzed. The determined acid value was 4.7 mg KOH/gram, and hydroxy value was 21.5 mg KOH/gram. Analysis of the polymer by GPC (using linear polystyrene standards) showed the polymer to have an $M_w$ value of 28,237, $M_n$ value of 5,348, and an $M_w/M_n$ value of 5.3. The melting temperature was determined to be 53.7 by differential scanning calorimetry, and no glass transition temperature was observed.

Example 2

A star polymer was prepared as generally described in Example 1, only using 5.8 parts by weight dibutyltin oxide. To the star polymer was added 132.1 parts by weight of hexahydrophthalic anhydride. The resultant mixture was heated to react in a nitrogen atmosphere at a temperature of 120° C. The reaction was allowed to progress until no anhydride groups were detected by infrared spectroscopy analysis of the material.

The reaction product was then cooled, discharged and analyzed. The determined acid value was 25.9 mg KOH/gram, and hydroxy value was 12.4 mg KOH/gram. Analysis of the polymer by GPC (using linear polystyrene standards) showed the polymer to have an Mw value of 20,957, Mn value of 6,668, and an Mw/Mn value of 3.1. The melting temperature was determined to be 53.2 by differential scanning calorimetry, and no glass transition temperature was observed.

Example 3

A highly branched polyester was prepared using the following procedure. One hundred parts by weight of tris(hydroxyethyl)isocyanurate, 47.6 parts by weight of isophthalic acid, and 4.4 parts by weight dibutyl tin oxide were charged to a round-bottomed glass flask equipped with a mechanical stirrer, nitrogen inlet tube, thermometer, steam jacket column, fractionating column, and a distillation head connected to a condenser and a receiver. The resultant mixture was heated to react in a nitrogen atmosphere. At 100° C., water generated by the esterification process began to be collected. With continuous removal of water, heating continued to 220° C. The reaction was allowed to continue until water was no longer being generated by the reaction, at which time the reaction product was cooled to ambient temperature.

To this highly branched polyester was added 2053.3 parts by weight of ε-caprolactone. The resultant mixture was heated to react in a nitrogen atmosphere at a temperature of 165° C. The reaction was allowed to progress for four hours at that temperature, at which time it was allowed to cool to ambient temperature.

The reaction product was then cooled, discharged and analyzed. The determined acid value was 7.7 mg KOH/gram, and hydroxy value was 14.4 mg KOH/gram. Analysis of the polymer by GPC (using linear polystyrene standards) showed the polymer to have an $M_w$ value of 25,618, $M_n$ value of 4,998, and an $M_w/M_n$ value of 3.1. The melting temperature was determined to be 53.4 by differential scanning calorimetry, and no glass transition temperature was observed.

Example 4

A highly branched polyurethane was prepared using the following procedure. 126 parts by weight of cyclohexyl dimethylol, 12.6 parts by weight of trimethylol propane, 113.5 parts by weight isophorone diisocyanate, and 48.6 parts by weight hexamethylene diisocyanate, and 0.5 parts by weight dibutyl tin dilaurate were charged to a round-bottomed glass flask equipped with a mechanical stirrer, nitrogen inlet tube, thermometer, and condenser. The resultant mixture was heated to react in a nitrogen atmosphere. The reaction was initially carried out at 85° C., and was continuously increased to 235° C. as needed to maintain sufficient agitation. The reaction was allowed to continue until no isocyanate groups were detected by infrared spectroscopy analysis of the material, at which time the reaction product was cooled to ambient temperature.

To this highly branched polyurethane was added 1359.5 parts by weight of ε-caprolactone, and 2.7 parts by weight tin octoate. The resultant mixture was heated to react in a nitrogen atmosphere at a temperature of 165° C. The reaction was allowed to progress for four hours at that temperature, at which time it was allowed to cool to ambient temperature.

To this star polymer was added 27.5 parts by weight of hexahydrophthalic anhydride. The resultant mixture was heated to react in a nitrogen atmosphere at a temperature of 170° C. The reaction was allowed to progress until no anhydride groups were detected by infrared spectroscopy analysis of the material.

The reaction product was then cooled, discharged and analyzed. The determined acid value was 7.3 mg KOH/gram, and hydroxy value was 12.4 mg KOH/gram. Analysis of the polymer by GPC (using linear polystyrene standards) showed the polymer to have an $M_w$ value of 25,433, $M_n$ value of 10,216, and an $M_w/M_n$ value of 2.5.

Example 5

A highly branched polyamide was prepared using the following procedure. Seventy-one parts by weight of ethylene diamine and 75.7 parts by weight of trimellitic anhydride were charged to a round-bottomed glass flask equipped with a mechanical stirrer, nitrogen inlet tube, thermometer, and condenser. The resultant mixture was heated to react at 240° C. in a nitrogen atmosphere. The reaction was allowed to continue until the acid number was found to be less than 5.0 mg KOH/gram, at which time the reaction product was cooled to ambient temperature.

To this highly branched polyamide was added 1366.7 parts by weight of ε-caprolactam and 15.1 parts by weight of tin octoate. The resultant mixture was heated to react in a nitrogen atmosphere at a temperature of 240° C. The reaction was allowed to progress for six hours at that temperature.

Example 6

Samples 1 through 5 were prepared using the ingredients and amounts (in grams) shown in Table 1. The samples were prepared as follows: The ingredients were weighed together and processed for ~20 s in a Prism blender at 3500 rpm's. This premix was then extruded through a b&p Process Equipment and Systems 19 mm, co-rotating, twin screw extruder at 450 rpm's, at temperatures ranging from 100° C. to 115° C. The resultant chip was milled and classified to a median particle size of 30 to 50 μm on a Hosokawa Micron Powder Systems Air Classifying Mill I. The formulas were then electrostatically sprayed using Nordson corona equipment onto cold rolled steel panels supplied by ACT Laboratories as B-1000 P60 DIW, nonpolished panels. Finally, the panels were baked in electric Despatch LAD series ovens. Samples were baked for a dwell time of 25 minutes at 325° F. All testing was run at a dry film thickness of 2.5 to 3.0 mils.

As can be seen in Table 1, Samples 2-5, which incorporated the additives of the present invention, had greatly improved impact resistance and offgassing as compared with Control Sample 1, which lacked the present additives.

The product prepared according to Example 1 was also incorporated into an isocyanate system using the ingredients and amounts (in grams) shown in Table 2. The formulas were prepared in exactly the same fashion as stated for Table 1, except samples were baked for a dwell time of 23 minutes at 380° F.

TABLE 1

| Material | Sample 1 | Sample 2 | Sample 3 | Sample 4 | Sample 5 |
|---|---|---|---|---|---|
| RUCOTE 121[1] | 359.1 | 346.0 | 332.9 | 339.0 | 318.9 |
| Product from Example 1 | — | — | — | 35.0 | 70.0 |
| Product from Example 3 | — | 35.0 | 70.0 | — | — |
| Aminoplast Crosslinker[2] | 70.0 | 70.0 | 70.0 | 70.0 | 70.0 |
| Di-p-tolylsulfonimide | 1.5 | 1.5 | 1.5 | 1.5 | 1.5 |
| 2,2,6,6-tetramethylpiperidinol | 0.6 | 0.6 | 0.6 | 0.6 | 0.6 |
| Benzoin | 3.0 | 3.0 | 3.0 | 3.0 | 3.0 |
| RESIFLOW PL-200[3] | 6.0 | 6.0 | 6.0 | 6.0 | 6.0 |
| LICOWAX C[4] | 6.0 | 6.0 | 6.0 | 6.0 | 6.0 |
| THIXCIN R[5] | 20.0 | 20.0 | 20.0 | 20.0 | 20.0 |
| Dibutylamine | 0.6 | 0.6 | 0.6 | 0.6 | 0.6 |
| TiO$_2$ R706 | 220.0 | 220.0 | 220.0 | 220.0 | 220.0 |
| Impact (direct/reverse)(in-lbs)[6] | 60/50 | 160/160 | 160/160 | 160/160 | 160/160 |
| MEK (50 double rubs)[7] | 4 | 4 | 4 | 4 | 4 |
| Off-gassing thickness (mils)[8] | 6.6 | 8.5 | 9.4 | 7.8 | 11.6 |

[1]Standard durable 40 OH functional polyester, from Bayer Corporation.
[2]Aminoplast crosslinker synthesized by the following method: Into a five-liter four-necked reaction kettle equipped with a thermometer, a mechanic stirrer, a nitrogen inlet, and means for removing the by-product (methanol) were placed 1728.0 parts by weight of CYMEL ® 303, 919.0 parts by weight of p-toluic acid, 706.9 parts by weight of 1H-benzotriazole, and 2.4 part by weight of p-toluenesulfonicacid. The mixture was heated to 145° C. and the temperature was maintained under nitrogen sparge while the methanol by-product was removed from the system. The reaction progress was monitored by sampling the mixture for acid value measurements. The reaction was terminated when the acid value was less than 30. The reaction mixture was allowed to cool slightly before being discharged from the reactor. The product thus obtained is a pale yellow solid product with a Tg of 44° C. asmeasured by DSC.
[3]Acrylic flow additive dispersed on silica, from Estron Chemical.
[4]Ethylene bis(stearamide), from Clariant Additives.
[5]Castorwax derivative, from Elementis Specialties.
[6]Impact testing was run according to ASTM D 2794 using a Byk-Gardner Falling Dart Impact tester.
[7]MEK resistance was run by rubbing a Q-tip soaked with methyl ethyl ketone back and forth across a panel (one double rub) 50 times and then rating the resulting marks as follows: MEK rating system:
0 No change
1 Slight gloss loss around test area
2 Barely detectable gloss loss in test area
3 Barely detectable scuffing of test area
4 Slightly detectible scuffing of test area
5 Noticeable scuffing of test area
6 Marring of test area
7 Smearing of test area
Readings of 0-5 are generally regarded as acceptable.
[8]Off-gassing was tested by spraying a panel so that the coating increased in thickness from top to bottom. The panel was baked at 350° F. for 25 minutes and the film thickness where pinholes and/or blisters began was recorded in mils. The higher the number, the more tolerant the coating is to off-gassing. The error in the test is approximately ±1 mil.

TABLE 2

| Material | Sample 6 | Sample 7 | Sample 8 | Sample 9 | Sample 10 | Sample 11 |
|---|---|---|---|---|---|---|
| URALAC P-1580[9] | 330.0 | 321.9 | 313.8 | — | — | — |
| CRYLCOAT 690[10] | — | — | — | 420.0 | 397.0 | 374.0 |
| Product from Example 1 | — | 30.0 | 60.0 | — | 30.0 | 60.0 |
| VESTAGON EP-B 1400[11] | 165.0 | 165.0 | 165.0 | 74.1 | 74.1 | 74.1 |
| BUTAFLOW BT-71[12] | 1.5 | 1.5 | 1.5 | 1.5 | 1.5 | 1.5 |
| Benzoin | 3.0 | 3.0 | 3.0 | 3.0 | | 3.0 |
| RESIFLOW PL-200[3] | 7.0 | 7.0 | 7.0 | 7.0 | 7.0 | 7.0 |
| TiO$_2$ R706 | 225.0 | 225.0 | 225.0 | 225.0 | 225.0 | 225.0 |
| Impact (direct/reverse)(in-lbs)[6] | 50/40 | 100/160 | 160/160 | 30/<20 | 60/20 | 160/160 |
| | | | | | Stretches, not cracks | |
| MEK (50 double rubs)[7] | 6 | 4 | 5 | 3 | 3 | 2 |

[9]Superdurable 85 OH functional polyester from DSM Resins.
[10]Superdurable 30 OH functional polyester from UCB Surface Specialties
[11]ε-Caprolactam blocked isophorone diisocyanate from Degussa CRM
[12]71% Dibutyltin dilaurate on silica support, from Estron Chemical.

As can be seen in Table 2, the samples prepared with the present additives again had improved impact resistance and comparable if not better MEK resistance.

Samples 12-16 were prepared using the ingredients and amounts (in grams) shown in Table 3. The formulas were prepared in exactly the same fashion as stated previously except that Samples 12 and 13 were sprayed onto panels supplied by ACT Laboratories as B-1000 P60 DIW, non-polished panels which were first coated in the lab with P-590 electrocoat available from PPG Industries, Inc. Samples 14-16 were sprayed onto similar substrate supplied entirely by ACT Laboratories as APR 45254. The formulations were baked for a dwell time of 25 minutes at 375° F.

TABLE 3

| Material | Sample 12 | Sample 13 | Sample 14 | Sample 15 | Sample 16 |
|---|---|---|---|---|---|
| CRYLCOAT 630[13] | 502.8 | 475.1 | 502.8 | 500.2 | 497.7 |
| Product from Example 2 | — | 56.0 | — | — | — |
| Product from Example 4 | — | — | — | 15.0 | 30.0 |
| Triglycidylisocyanurate[14] | 37.8 | 37.8 | 37.8 | 37.8 | 37.8 |
| VESTAGON BF 1540[15] | 21.0 | 21.0 | 21.0 | 21.0 | 21.0 |
| ACTIRON 32-057[16] | 1.4 | 1.4 | 1.4 | 1.4 | 1.4 |
| Benzoin | 5.6 | 5.6 | 5.6 | 5.6 | 5.6 |
| RESIFLOW PL-200[3] | 7.0 | 7.0 | 7.0 | 7.0 | 7.0 |
| LICOWAX C[4] | 2.6 | 2.6 | 2.6 | 2.6 | 2.6 |
| IRGANOX 1076[17] | 8.4 | 8.4 | 8.4 | 8.4 | 8.4 |
| TiO$_2$ R706 | 84.0 | 84.0 | 150.0 | 150.0 | 150.0 |
| 264-8143 Fastolux Green[18] | 7.6 | 7.6 | | | |
| Vynamon Blue G FW 025[19] | 2.0 | 2.0 | | | |
| Colortherm 10 Yellow Iron Oxide[20] | 5.1 | 5.1 | | | |
| Impact (direct/reverse)(in-lbs)[7] | 50/50 | 100/100 | 40/<20 | 50/<20 | 70/40 |
| MEK (50 double rubs)[8] | 4 | 3 | 6 | 5 | 6 |

[13]Superdurable 35 COOH functional polyester, from UCB Surface Specialties.
[14]Available from Vantico Inc.
[15]Self-blocked isophorone diisocyanate, from Degussa CRM.
[16]Dimethyl lauryl amine on silica support, from Synthron Inc.
[17]Antioxidant, from CIBA Additives.
[18]Available from Sun Chemical.
[19]Available from Avecia Colours.
[20]Available from Bayer Chemicals.

Again, the use of the present additives gave improved impact and MEK resistance.

Whereas particular embodiments of this invention have been described above for purposes of illustration, it will be evident to those skilled in the art that numerous variations of the details of the present invention may be made without departing from the invention as defined in the appended claims.

What is claimed is:

1. A compound that comprises the reaction product of a highly branched polymer having terminal functional groups and a lactone, wherein the highly branched polymer is the step-growth polymerization reaction product of a polyfunctional first monomer having a first functional group and a polyfunctional second monomer having a second functional group wherein the first and second functional groups will react with each other but not themselves, and wherein the polymer is not a polyester.

2. The compound of claim 1, wherein the first monomer comprises at least one amine and the second monomer comprises at least one carboxylic acid.

3. The compound of claim 2, wherein the amine comprises ethylene diamine and the carboxylic acid comprises trimellitic anhydride.

4. The compound of claim 1, wherein the first monomer comprises at least one isocyanate and the second monomer comprises at least one alcohol.

5. The compound of claim 4, wherein the isocyanate comprises isophorone diisocyanate and the alcohol comprises trimethylol propane.

6. The compound of claim 1, wherein the first monomer comprises at least one isocyanate and the second monomer comprises at least one amine.

7. The compound of claim 6, wherein the isocyanate comprises the isocyanurate of isophorone diisocyanate and the amine comprises ethylene diamine.

8. The compound of claim 1, wherein the highly branched polymer has a number average molecular weight of 500 to 10,000.

9. The compound of claim 1, wherein the terminal functional group is a hydroxy group.

10. The compound of claim 1, wherein the terminal functional group is an amine.

11. The compound of claim 1, wherein 1 to 100 percent of the terminal functional groups have a lactone grafted thereto.

12. The compound of claim 11, wherein greater than 90 percent of the terminal functional groups have a lactone grafted thereto.

13. The compound of claim 1, wherein the reaction product of the highly branched polymer and the lactone has a weight average molecular weight of 5,000 to 500,000.

14. The compound of claim 1, wherein the lactone comprises epsilon-caprolactone.

15. The compound of claim 1, wherein the reaction product of the highly branched polymer and the lactone comprises lactone chains comprising 1 to 50 lactone derived units.

16. A curable powder coating composition comprising:
(a) a compound that comprises the reaction product of a highly branched polymer having terminal functional groups and a lactone, wherein the highly branched polymer is the step-growth polymerization reaction product of a polyfunctional first monomer having a first functional group and a polyfunctional second monomer having a second functional group wherein the first and second functional groups will react with each other but not themselves; and
(b) a crosslinker.

17. The curable powder coating composition of claim 16, wherein the first monomer is at least one alcohol and the second monomer is at least one carboxylic acid.

18. The curable powder coating composition of claim 17, wherein the alcohol comprises trimethylol propane and the carboxylic acid comprises adipic acid.

19. The compound of claim 16, wherein the first monomer comprises at least one amine and the second monomer comprises at least one carboxylic acid.

20. The compound of claim 19, wherein the amine comprises ethylene diamine and the carboxylic acid comprises trimellitic anhydride.

21. The compound of claim 16, wherein the first monomer comprises at least one isocyanate and the second monomer comprises at least one alcohol.

22. The compound of claim 21, wherein the isocyanate comprises isophorone diisocyanate and the alcohol comprises trimethylol propane.

23. The compound of claim 16, wherein the first monomer comprises at least one isocyanate and the second monomer comprises at least one amine.

24. The compound of claim 23, wherein the isocyanate comprises the isocyanurate of isophorone diisocyanate and the amine comprises ethylene diamine.

25. The compound of claim 16, wherein the highly branched polymer has a number average molecular weight of 500 to 10,000.

26. The compound of claim 16, wherein the terminal functional group is a hydroxy group.

27. The compound of claim 16, wherein the terminal functional group is an amine.

28. The compound. of claim 16, wherein 1 to 100 percent of the terminal functional groups have a lactone grafted thereto.

29. The compound of claim 28, wherein greater than 90 percent of the terminal functional groups have a lactone grafted thereto.

30. The compound of claim 16, wherein the reaction product of the highly branched polymer and the lactone has a weight average molecular weight of 5,000 to 500,000.

31. The compound of claim 16, wherein the lactone comprises epsilon-caprolactone.

32. The compound of claim 16, wherein the reaction product of the highly branched polymer and the lactone comprises lactone chains comprising 1 to 50 lactone derived units.

33. The curable powder coating composition of claim 16, wherein said coating composition does not contain moieties curable by UV radiation.

* * * * *